(12) United States Patent
Mizutani et al.

(10) Patent No.: US 10,003,613 B2
(45) Date of Patent: Jun. 19, 2018

(54) SECURITY INSPECTION OF MASSIVE VIRTUAL HOSTS FOR IMMUTABLE INFRASTRUCTURE AND INFRASTRUCTURE AS CODE

(71) Applicant: INTERNATIONAL BUSINESS MACHINES CORPORATION, Armonk, NY (US)

(72) Inventors: Masayoshi Mizutani, Tokyo (JP); Takahide Nogayama, Yokohama (JP); Raymond H. P. Rudy, Tokyo (JP); Scott R. Trent, Yokohama (JP); Yuta Tsuboi, Tokyo (JP); Yuji Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 14/975,057

(22) Filed: Dec. 18, 2015

(65) Prior Publication Data

US 2017/0180422 A1    Jun. 22, 2017

(51) Int. Cl.
| | |
|---|---|
| *H04L 29/06* | (2006.01) |
| *G06F 12/14* | (2006.01) |
| *H04L 9/32* | (2006.01) |
| *G06F 21/53* | (2013.01) |
| *G06F 21/56* | (2013.01) |

(52) U.S. Cl.
CPC .............. *H04L 63/20* (2013.01); *G06F 21/53* (2013.01); *G06F 21/56* (2013.01); *H04L 2463/146* (2013.01)

(58) Field of Classification Search
CPC ....................................................... H04L 63/20
USPC ................. 726/1, 23, 24; 713/165, 168, 188
See application file for complete search history.

(56) References Cited

U.S. PATENT DOCUMENTS

| | | | |
|---|---|---|---|
| 9,369,484 B1* | 6/2016 | Lacerte | H04L 63/1441 |
| 2011/0277034 A1* | 11/2011 | Hanson | H04L 63/1433 726/25 |
| 2012/0078991 A1* | 3/2012 | Nakanishi | G06F 17/16 708/446 |
| 2014/0181984 A1* | 6/2014 | Kundu | G06F 17/30129 726/26 |
| 2015/0192658 A1* | 7/2015 | Ullah | G01S 5/04 455/456.1 |
| 2015/0256431 A1* | 9/2015 | Buchanan | H04L 63/1408 709/224 |

(Continued)

*Primary Examiner* — Aravind K Moorthy
(74) *Attorney, Agent, or Firm* — Tutunjian & Bitetto, P.C.; Vazken Alexanian

(57) ABSTRACT

A method and system are provided for performing a security inspection of a set of virtual images in a cloud infrastructure. The method includes merging the virtual images into a tree structure having a root and a plurality of leaves such that child leaves and a parent leaf to the child leaves have common ones of the virtual images. The method further includes identifying a security violation in a given one of the virtual images at a given one of the plurality of leaves. The method also includes applying a bisection method against a path in the tree from the root to the given one of the plurality of leaves to find a particular one of the virtual images that is a root cause of the security violation. The method additionally includes performing a corrective action for any of the plurality of images having the security violation.

20 Claims, 20 Drawing Sheets

(56) References Cited

U.S. PATENT DOCUMENTS

2015/0309790 A1* 10/2015 Henriksen ......... G06F 17/30106
                                                            717/121
2017/0147819 A1*  5/2017 Vasilenko ............. G06F 21/566

* cited by examiner

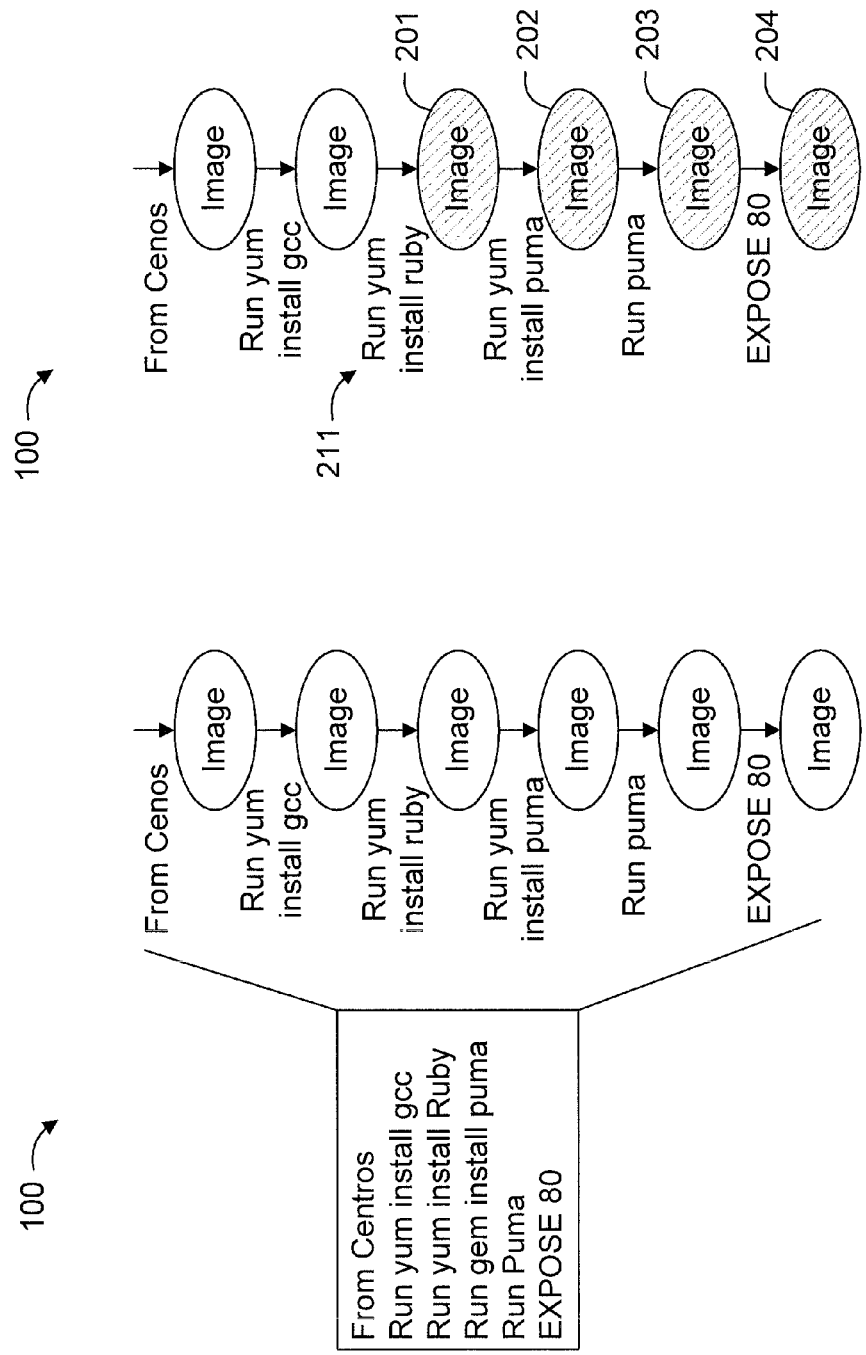

```
Safe_set ←{}
Violation_set ←{}
Root_cause_set ← {}
# sub_root is a root image of a given sub tree
function inspect(sub_root)
      leaf ← pick up one leaf image in this sub tree.
      Inspect the leaf image.
      if (leaf image is violation)
         Add leaf image to Violation_set
         Root cause image ← detect by bisection method.
         Add the root cause image to Root_cause_set.
         Add all parent images of the root cause image to Safe_set
         Add all images in the subtree of the root cause image to Violation_set
      else
            Add all parent images of the leaf image to Safe_set
            for each child subtree
               sub_root2 ← the root image of the sub tree
                  if (Safe_set does not include sub_root2 )
                        and (Violation_set does not include sub_root2)
                        inspect(sub_root2)        # recursive call
                  end
            end
      end
end inspect(root)
return Root_cause_set
```

FIG. 19

SECURITY INSPECTION OF MASSIVE VIRTUAL HOSTS FOR IMMUTABLE INFRASTRUCTURE AND INFRASTRUCTURE AS CODE

BACKGROUND

Technical Field

The present invention relates generally to information processing and, in particular, to security inspection of massive virtual hosts for an immutable infrastructure and infrastructure as code.

Description of the Related Art

Security inspection is crucial for cloud vendors that provide virtual image hosting because its customers can upload virtual images that have security violations. Examples of security violations are a short password that does not meet a minimum password length requirement, the installation of a vulnerable application, an incorrect directory permission, and so forth. The images can be virtual machine images, which must have high integrity since the initial state of every virtual machine in the cloud is determined by some image. Moreover, as some benefits of the cloud depend on users using images generated by third parties, users must also be able to safely share images.

In a modern server management method referred to as Infrastructure as Code (IaC) and Immutable Infrastructure (II), setup scripts are used. When a new server is deployed, just a setup script is executed on a default operating system.

The cost of security inspection is expensive since it involves setting up an inspection tool on a virtual host. Due to the expansion of IaC and II, the number of servers in a data center is significantly increasing. Accordingly, the cost of security inspection for servers in a data center is also becoming significantly expensive.

Thus, there is a need to efficiently conduct security inspection on a number of setup scripts, and detect a root cause script line of a security violation.

SUMMARY

According to an aspect of the present principles, a method is provided for performing a security inspection of a set of virtual images in a cloud infrastructure. The method includes merging the virtual images into a tree structure having a root and a plurality of leaves such that child leaves and a parent leaf to the child leaves have common ones of the virtual images. The method further includes identifying a security violation in a given one of the virtual images at a given one of the plurality of leaves. The method also includes applying a bisection method against a path in the tree from the root to the given one of the plurality of leaves to find a particular one of the virtual images that is a root cause of the security violation. The method additionally includes performing a corrective action for any of the plurality of images having the security violation.

According to another aspect of the present principles, a computer program product is provided for performing a security inspection of a set of virtual images in a cloud infrastructure. The computer program product includes a non-transitory computer readable storage medium having program instructions embodied therewith. The program instructions are executable by a computer to cause the computer to perform a method. The method includes merging the virtual images into a tree structure having a root and a plurality of leaves such that child leaves and a parent leaf to the child leaves have common ones of the virtual images. The method further includes identifying a security violation in a given one of the virtual images at a given one of the plurality of leaves. The method also includes applying a bisection method against a path in the tree from the root to the given one of the plurality of leaves to find a particular one of the virtual images that is a root cause of the security violation. The method additionally includes performing a corrective action for any of the plurality of images having the security violation.

According to yet another aspect of the present principles, a system is provided for performing a security inspection of a set of virtual images in a cloud infrastructure. The system includes a hardware processor and a memory device. The hardware processor and the memory device are configured to merge the virtual images into a tree structure having a root and a plurality of leaves such that child leaves and a parent leaf to the child leaves have common ones of the virtual images. The hardware processor and the memory device are further configured to identify a security violation in a given one of the virtual images at a given one of the plurality of leaves. The hardware processor and the memory device are also configured to apply a bisection method against a path in the tree from the root to the given one of the plurality of leaves to find a particular one of the virtual images that is a root cause of the security violation. The hardware processor and the memory device are additionally configured to perform a corrective action for any of the plurality of images having the security violation.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 1 shows an incremental image creation process for each line in a setup script;

FIG. 2 further shows the process 100 of FIG. 1, wherein a security violation is injected by a root cause script line 201;

FIG. 19 shows exemplary pseudocode 1900 for virtual image inspection, in accordance with an embodiment of the present principles;

DETAILED DESCRIPTION OF PREFERRED EMBODIMENTS

The present principles are directed to security inspection of massive virtual hosts for an immutable infrastructure and infrastructure as a code. The present principles can be used to inspect images such as, for example, but not limited to, virtual machine images that encapsulate each application of the cloud.

FIG. 1 shows an incremental image creation process 100 for each line in a setup script, to which the present principles can be applied, in accordance with an embodiment of the present principles. FIG. 2 further shows the process 100 of FIG. 1, wherein a security violation is injected in a given image 201 by a root cause script line 211 and propagated to subsequent images 202, 203, and 204, to which the present principles can be applied, in accordance with an embodiment of the present principles. The security violation is shown in the cross-hatched images.

Figure 3:
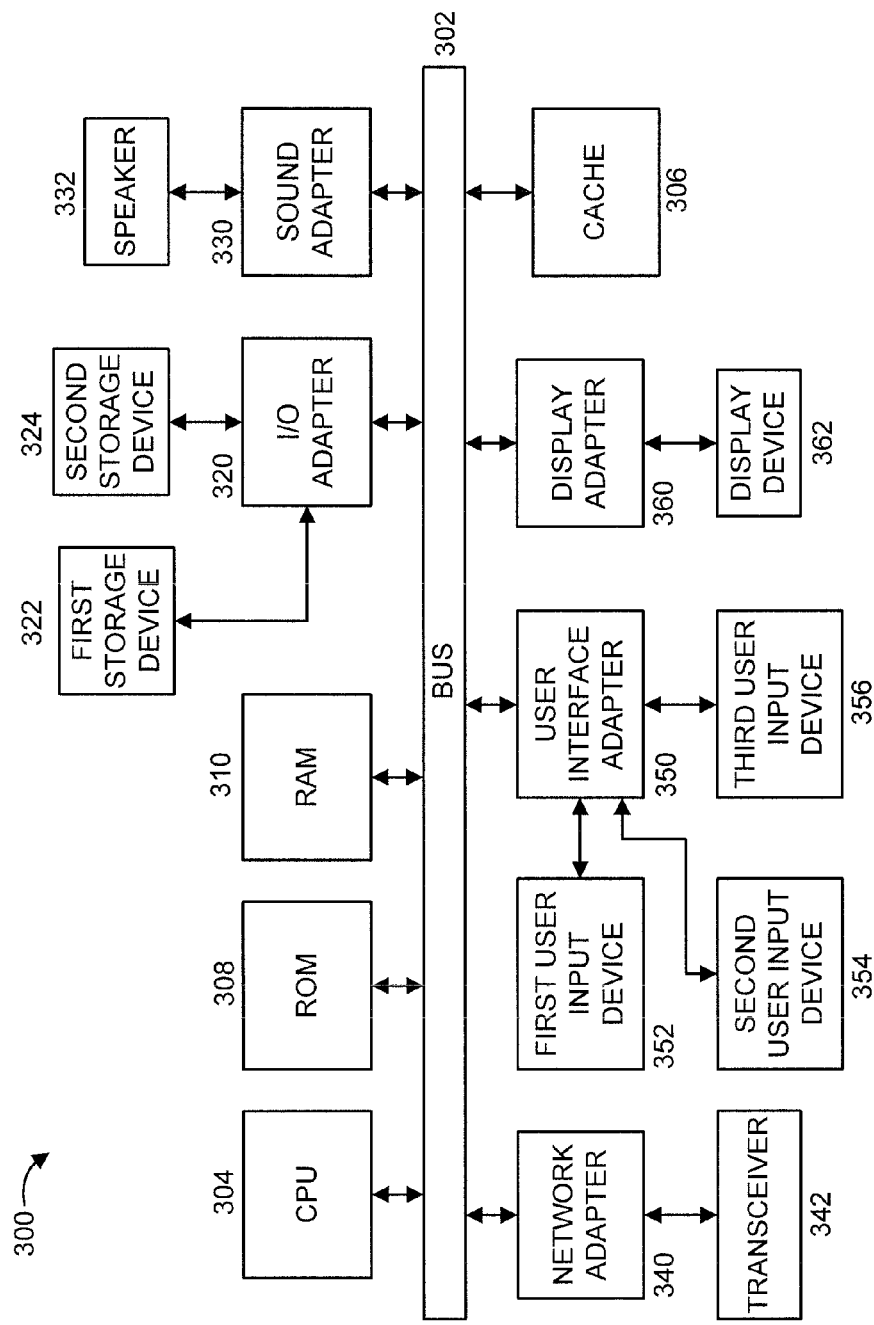
FIG. 3 shows an exemplary processing system 300 to which the present principles may be applied, in accordance with an embodiment of the present principles.

FIG. 3 shows an exemplary processing system 300 to which the present principles may be applied, in accordance with an embodiment of the present principles. The processing system 300 includes at least one processor (CPU) 304 operatively coupled to other components via a system bus 302. A cache 306, a Read Only Memory (ROM) 308, a Random Access Memory (RAM) 310, an input/output (I/O) adapter 320, a sound adapter 330, a network adapter 340, a user interface adapter 350, and a display adapter 360, are operatively coupled to the system bus 302.

A first storage device 322 and a second storage device 324 are operatively coupled to system bus 302 by the I/O adapter 320. The storage devices 322 and 324 can be any of a disk storage device (e.g., a magnetic or optical disk storage device), a solid state magnetic device, and so forth. The storage devices 322 and 324 can be the same type of storage device or different types of storage devices.

A speaker 332 is operatively coupled to system bus 302 by the sound adapter 330. A transceiver 342 is operatively coupled to system bus 302 by network adapter 340. A display device 362 is operatively coupled to system bus 302 by display adapter 360.

A first user input device 352, a second user input device 354, and a third user input device 356 are operatively coupled to system bus 302 by user interface adapter 350. The user input devices 352, 354, and 356 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 352, 354, and 356 can be the same type of user input device or different types of user input devices. The user input devices 352, 354, and 356 are used to input and output information to and from system 300.

Of course, the processing system 300 may also include other elements (not shown), as readily contemplated by one of skill in the art, as well as omit certain elements. For example, various other input devices and/or output devices can be included in processing system 300, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 300 are readily contemplated by one of ordinary skill in the art given the teachings of the present principles provided herein.

Figure 4:
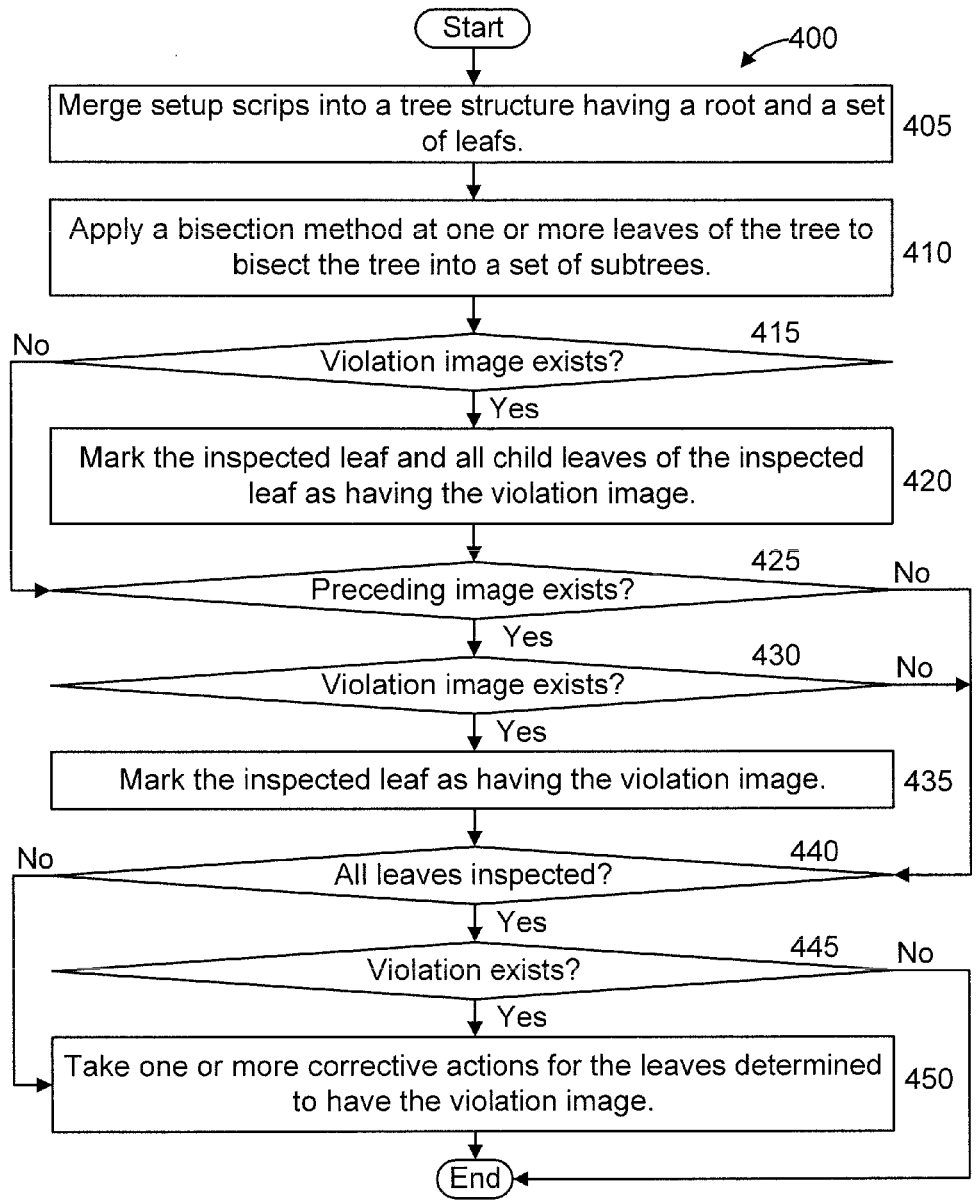
FIG. 4 shows an exemplary method 400 for security inspect of massive virtual hosts for Immutable Infrastructure (II) and Infrastructure as Code (IAC), in accordance with an embodiment of the present principles.

Further, it is to be appreciated that processing system 100 may perform at least part of the method described herein including, for example, at least part of method 400 of FIG. 4.

In the following FIGURES, "?" denotes a yet unknown status of an image, from among a "Safe" status, and a "Violation" status. Hence, "Safe" denotes a safe status of a given image, and "Violation" denotes a violation status of a given image.

FIG. 4 shows an exemplary method 400 for security inspect of massive virtual hosts for Immutable Infrastructure (II) and Infrastructure as Code (IAC), in accordance with an embodiment of the present principles. The method 400 is particularly suitable for entities that provide virtual image hosting.

Figure 5:
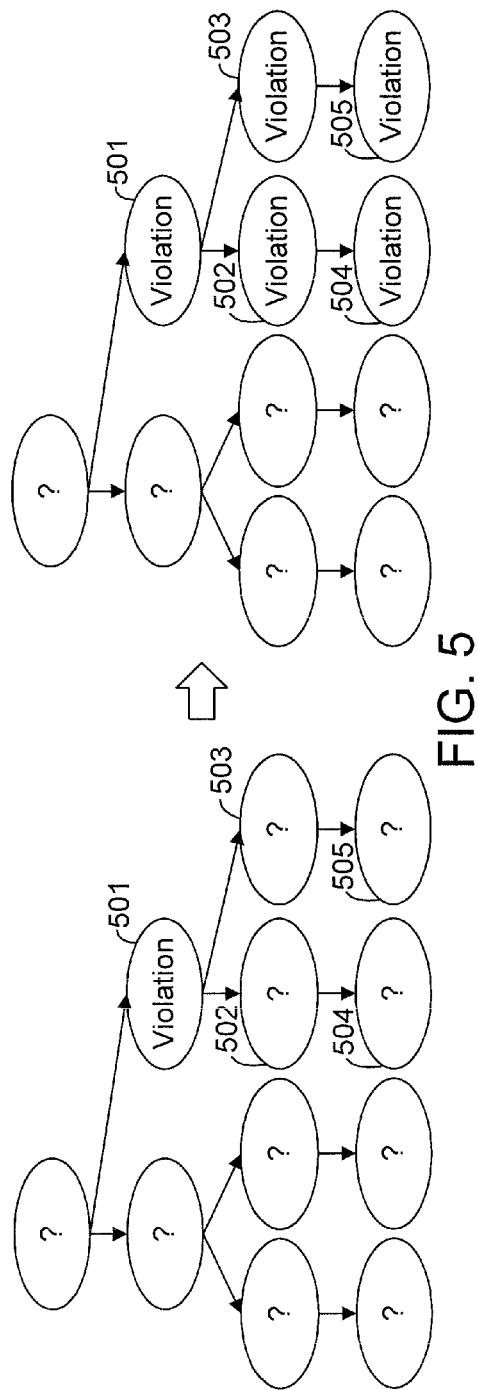
FIG. 5 shows a scenario 500 where the child images under a violation image have the same security violation without inspection, in accordance with an embodiment of the present principles.
Figure 6:
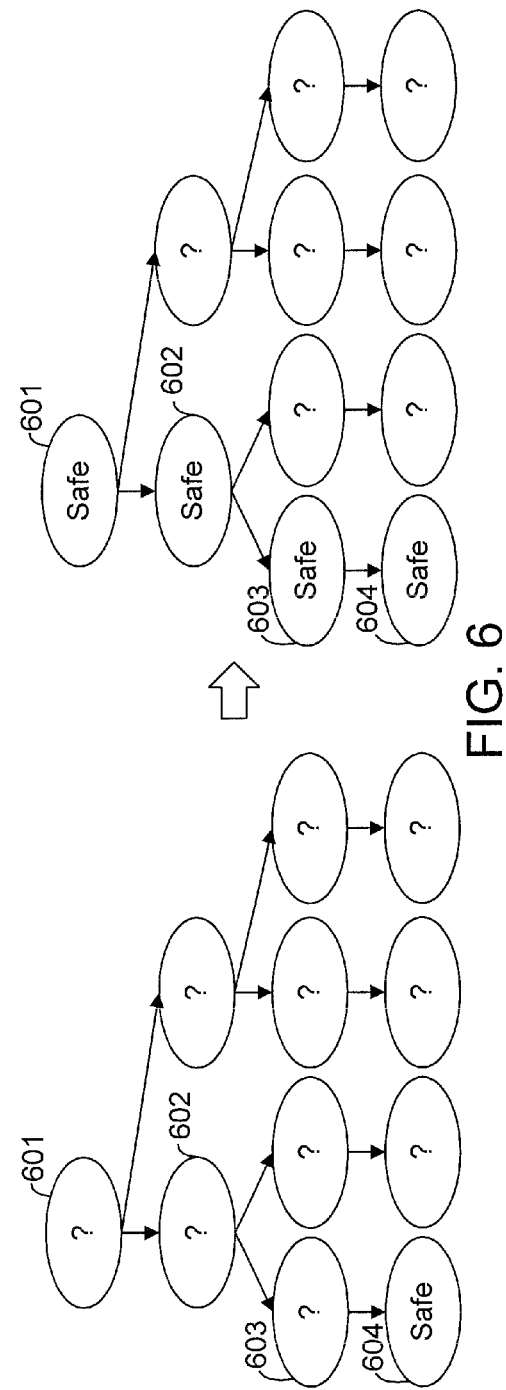
FIG. 6 shows a scenario 600 where the parent images of the safe image are presumed to also be safe without having to inspect them, in accordance with an embodiment of the present principles.
Figure 7:
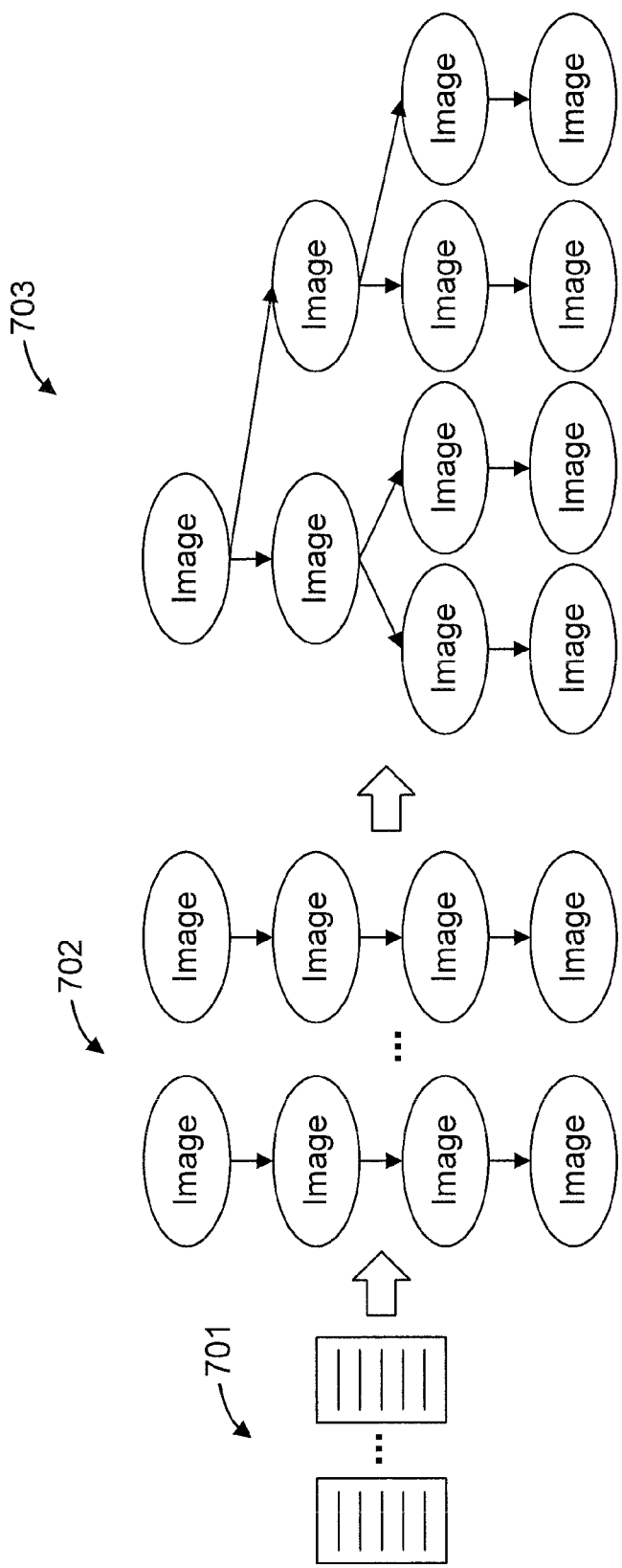
FIG. 7 shows a scenario 700 wherein a tree structure is constructed from setup scripts, in accordance with an embodiment of the present principles.
Figure 8:
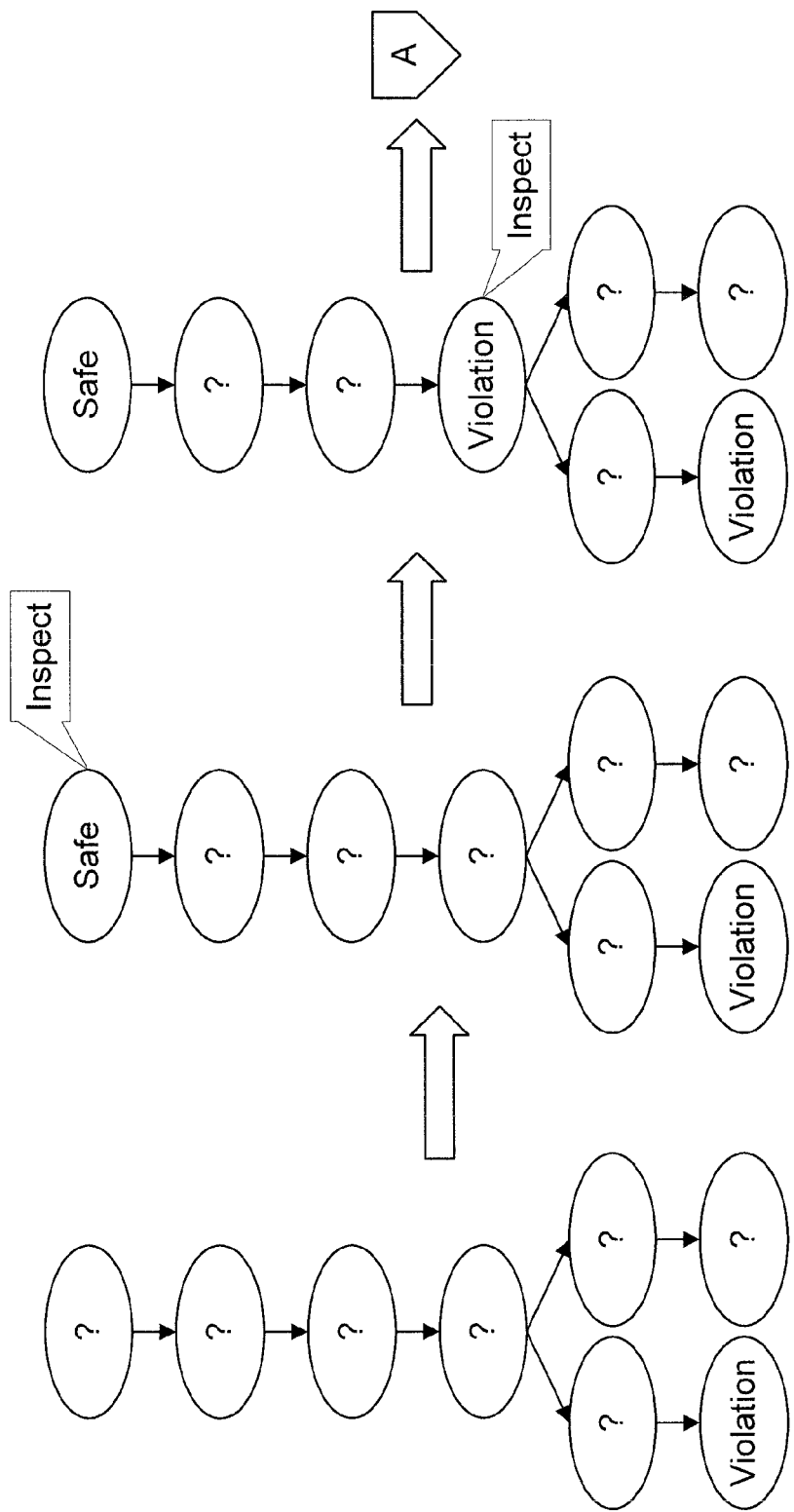
FIGS. 8-9 shows a violation image whose parent is a safe image using the bisection method according to the principles, in accordance with an embodiment of the present principles.
Figure 9:
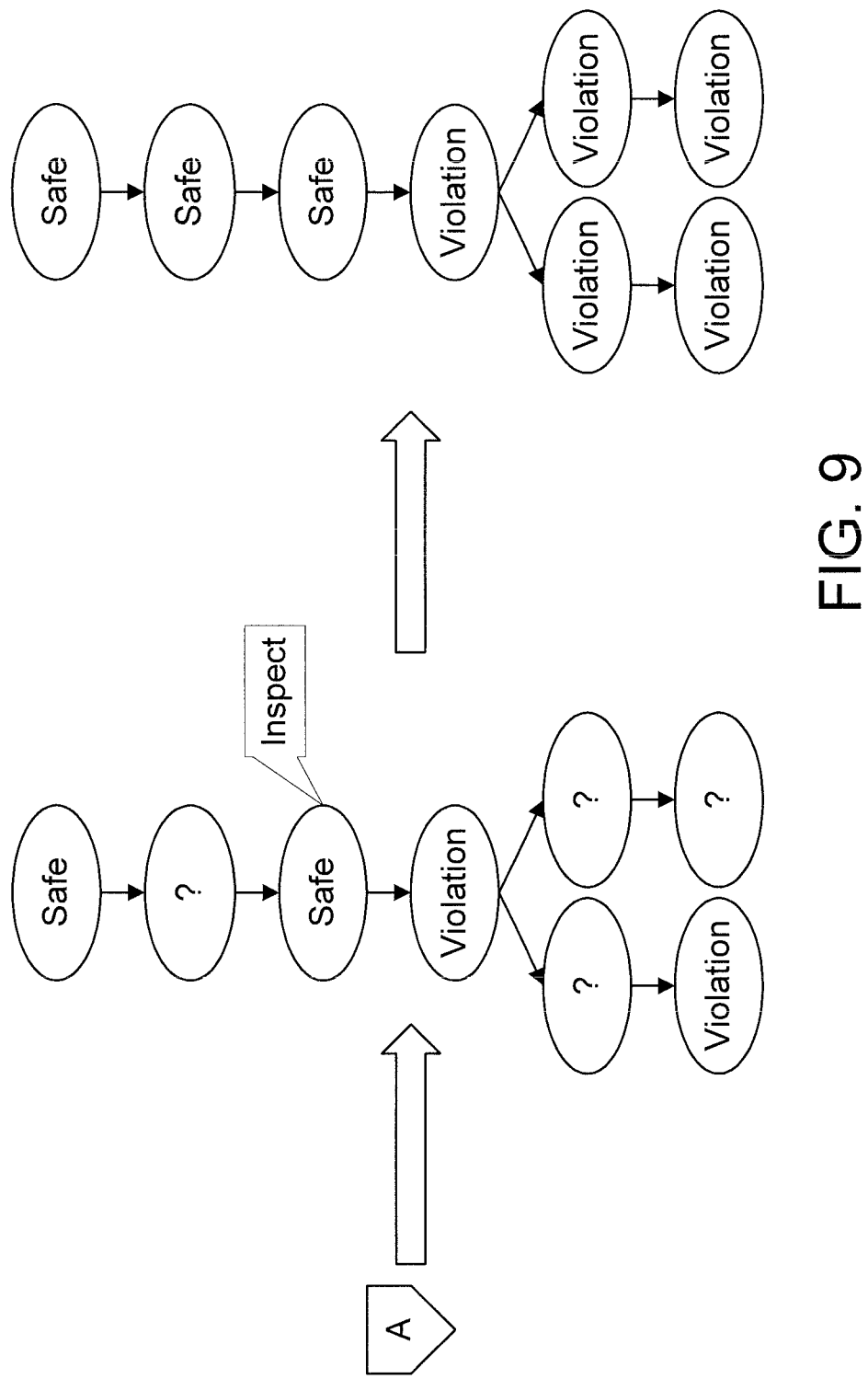

In an embodiment, FIG. 4 can be considered with respect to the scenarios 500, 600, and 700 shown in FIGS. 5, 6, and 7, respectively. FIG. 5 shows a scenario 500 where the child images under a violation image have the same security violation without inspection, in accordance with an embodiment of the present principles. FIG. 6 shows a scenario 600 where the parent images of the safe image are presumed to also be safe without having to inspect them, in accordance with an embodiment of the present principles. FIG. 7 shows a scenario 700 wherein a tree structure is constructed from setup scripts, in accordance with an embodiment of the present principles. FIGS. 8-9 shows a violation image whose parent is a safe image using the bisection method according to the principles, in accordance with an embodiment of the present principles.

It is to be appreciated that method 400 operates under the following two assumptions:

(1) A security violation propagates to all child images (see FIG. 5). In some coding styles such as DevOps and rapid development, developers concentrate on providing functionalities. The developers do not add security fix code in setup scripts. As a result, once an image (501) has a security violation, all child images (502, 503, 504, and 505) of that image (501) also have the same security violation.

(2) All parent images (601, 602, and 603) of a safe image (604) are also safe (see FIG. 6). This assumption is derived from the first assumption.

Thus, when a violation image is found on a leaf image, a root cause script line must exist in an image path from the root image to the leaf image. A bisection method (e.g., step 410) can be applied to find root cause scripts.

At step 405, merge images (702), created from setup scripts (701), into a tree structure (703) having a root and a set of leafs (see FIG. 7). In some cases, the setup scripts can share one or more script lines, which can reduce the search space in the tree.

At step 410, apply a bisection method (see FIGS. 8-9) at one or more leaves of the tree to bisect the tree into a set of subtrees.

At step 415, inspect a leaf image in the tree to determine whether or not a violation image exists on the inspected leaf image. If a violation image exists, then the method proceeds to step 420. Otherwise, the method proceeds to step 425.

At step 420, mark the inspected leaf and all child leaves of the inspected leaf as having the violation image.

At step 425, determine whether or not there is a preceding leaf image above the just inspected leaf image. If so, then the method proceeds to step 430. Otherwise, the method proceeds to step 440.

In an embodiment, step 425 can involve determining a (or more than one) common nearest parent image of violation images as the preceding image of step 425 that is subsequently proceeded to and inspected at step 430. This embodiment is explained further below with respect to FIG. 18.

At step 430, proceed to and inspect a preceding leaf image above the just inspected leaf image (that is, the parent leaf to the just inspected leaf) to determine whether or not a violation image exists on the preceding leaf image. If a violation image exists, then the method returns to step 435. Otherwise, the method proceeds to step 440.

At step 435, mark the inspected leaf as having the violation image. The method then return to step 425.

At step 440, determine whether or not all leaves have been inspected. If so, then the method proceeds to step 445. Otherwise, the method proceeds to step 450.

At step 445, proceed to an as of yet uninspected leaf and inspect that leaf to determine whether or not a violation image exists on that leaf. If a violation image exists, then the method returns to step 425. Otherwise, the method proceeds to step 450.

At step 450, take one or more corrective actions for the leaves determined to have the violation image and/or for the images themselves that have been determined to have the security violation. The corrective actions can include, but is not limited to, marking each of the images and/or the leaves that include them as having the security violation, attempting to retrieve a non-defective version of each image (e.g., from a remote source, etc.), and insert set up lines that fix the security violation just after the root cause script line of the set up script. Of course, other corrective actions can also be performed, while maintaining the spirit of the present principles.

Figure 10:
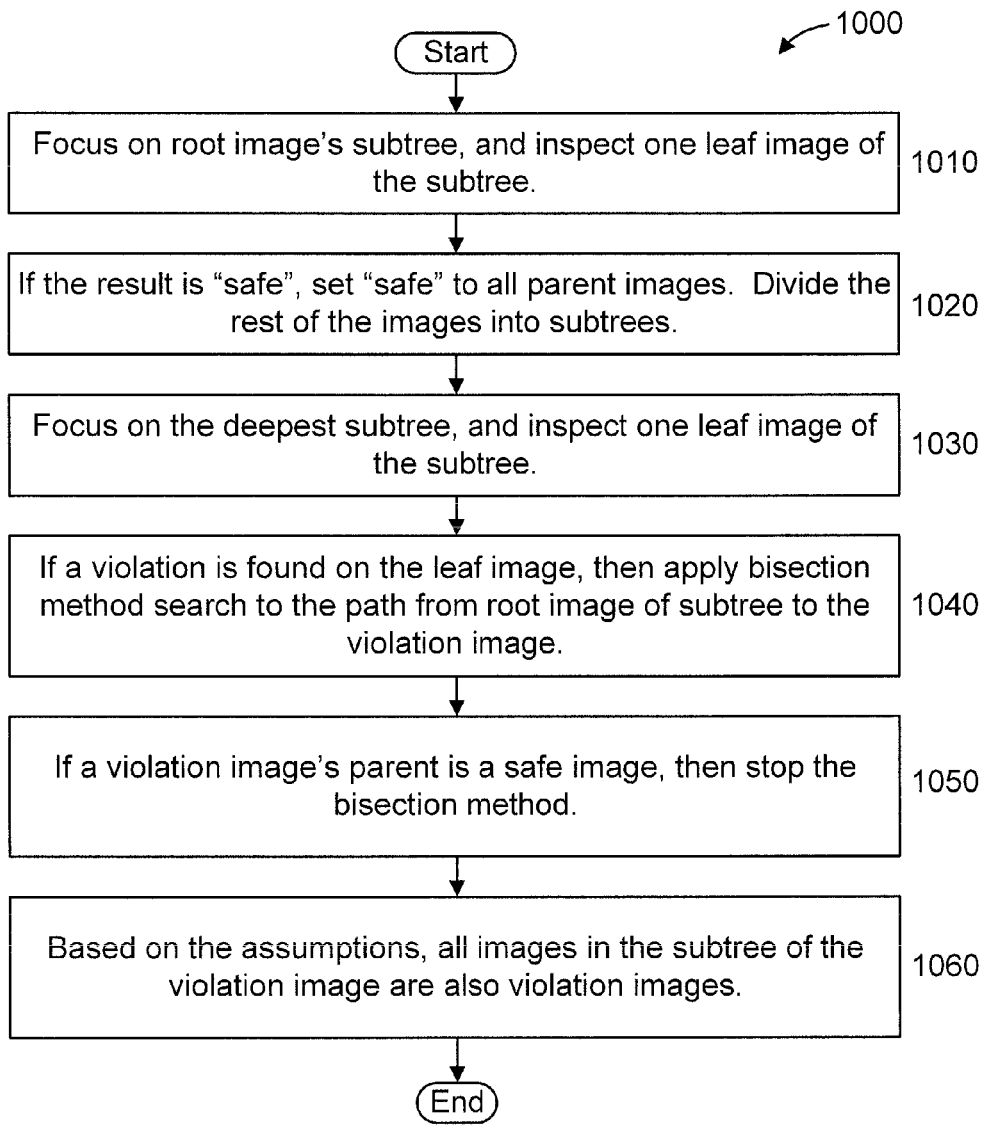
FIG. 10 shows another exemplary method 1000 for security inspect of massive virtual hosts for Immutable Infrastructure (II) and Infrastructure as Code (IAC), in accordance with an embodiment of the present principles.

FIG. 10 shows another exemplary method 1000 for security inspect of massive virtual hosts for Immutable Infrastructure (II) and Infrastructure as Code (IAC), in accordance with an embodiment of the present principles.

Figure 11:
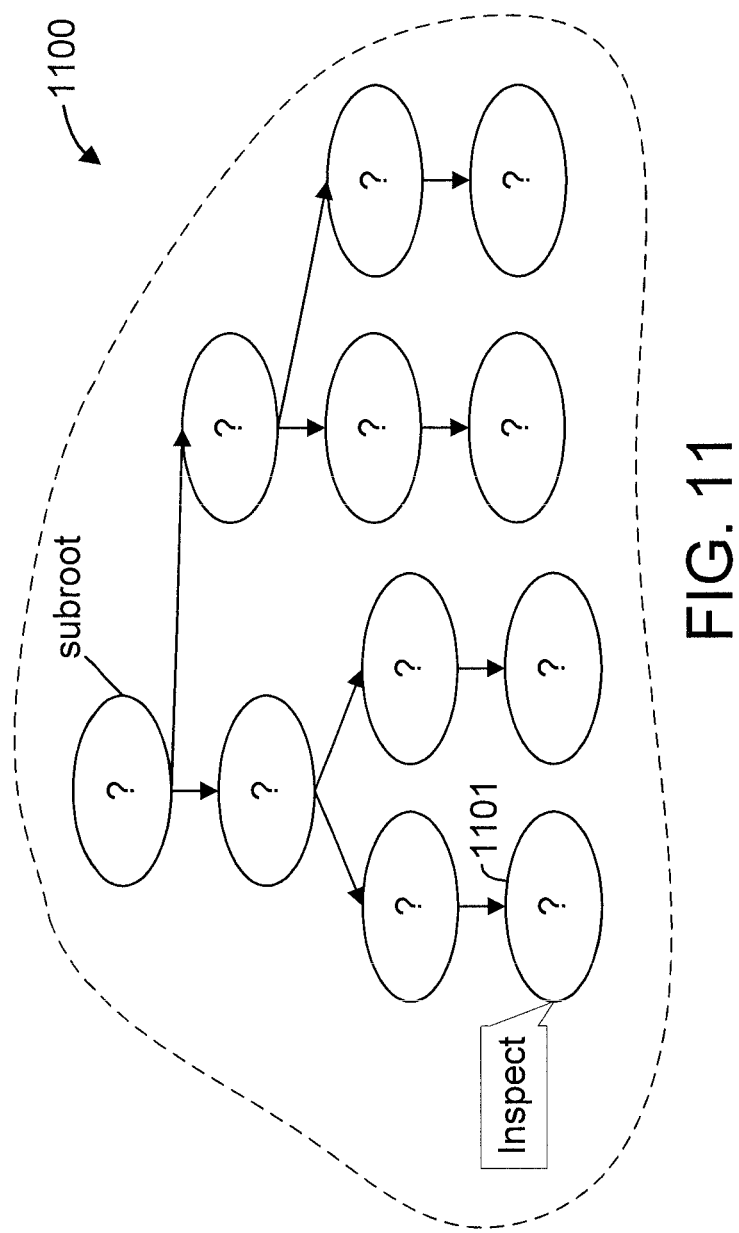
FIG. 11 shows an example of step 1010 of method 1000, in accordance with an embodiment of the present principles.

At step 1010, focus on root image's subtree 1100, and inspect one leaf image 1104 of the subtree. FIG. 11 shows an example of step 1010, in accordance with an embodiment of the present principles.

Figure 12:
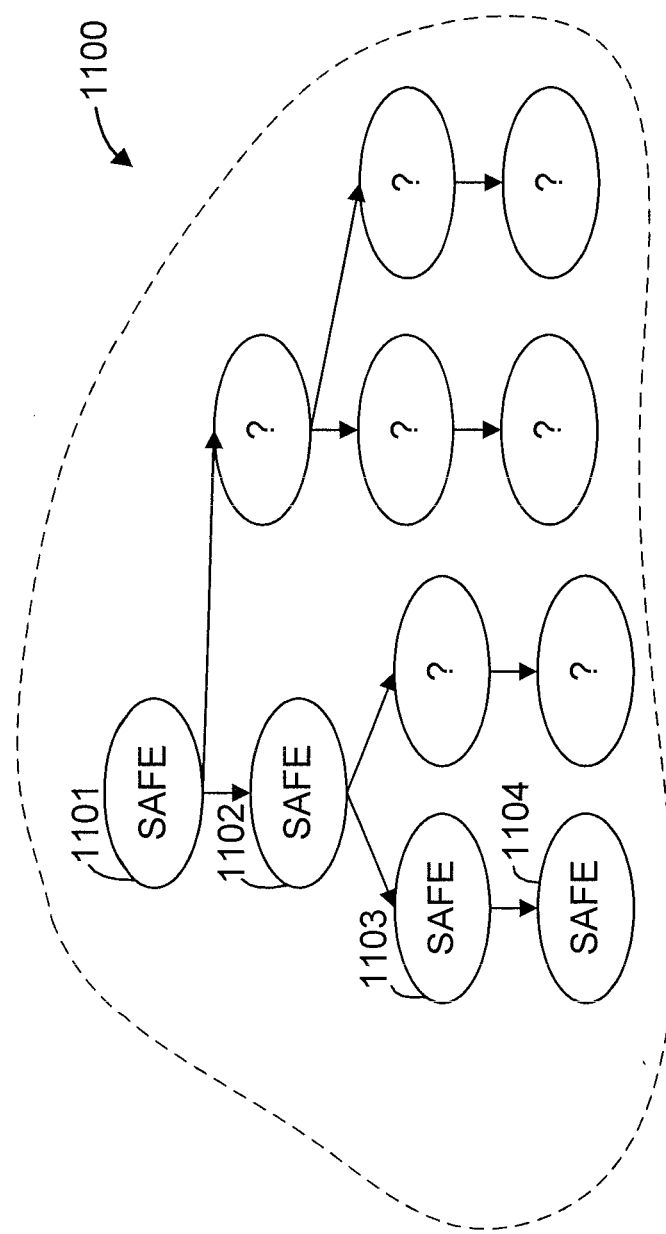
FIG. 12 shows an example of step 1020 of method 1000, in accordance with an embodiment of the present principles.

At step 1020, if the result for that one leaf image 1104 is "safe", set "safe" to all parent images 1101, 1102, and 1103. Divide the rest of the images into subtrees. FIG. 12 shows an example of step 1020, in accordance with an embodiment of the present principles.

Figure 13:
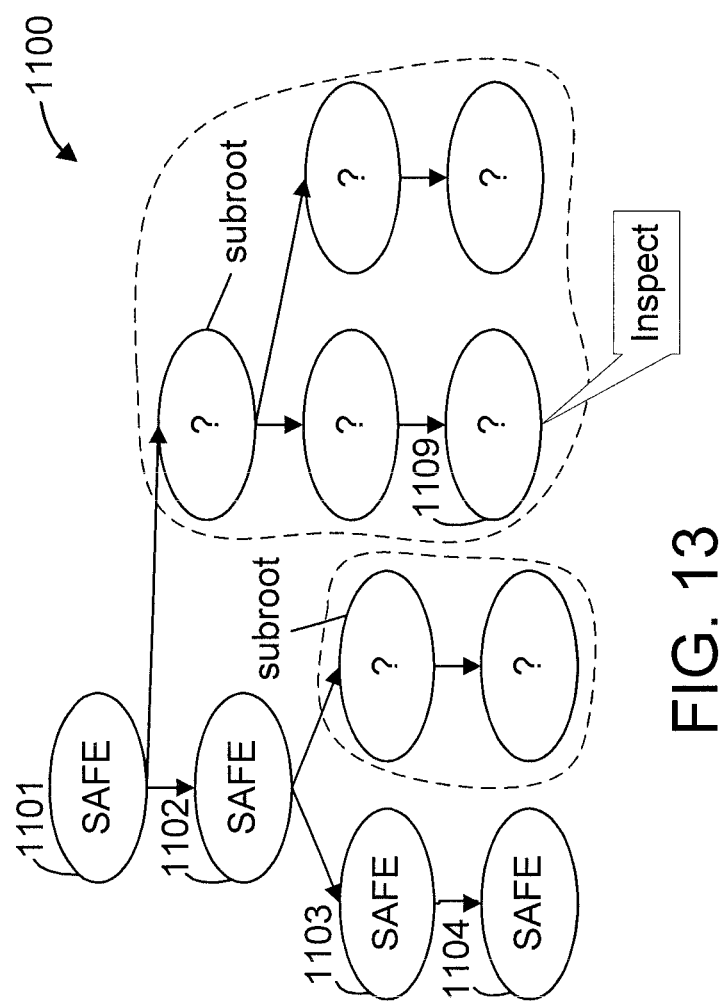
FIG. 13 shows an example of step 1030 of method 1000, in accordance with an embodiment of the present principles.

At step 1030, focus on the deepest subtree, and inspect one leaf image 1109 of the subtree. FIG. 13 shows an example of step 1030, in accordance with an embodiment of the present principles.

Figure 14:
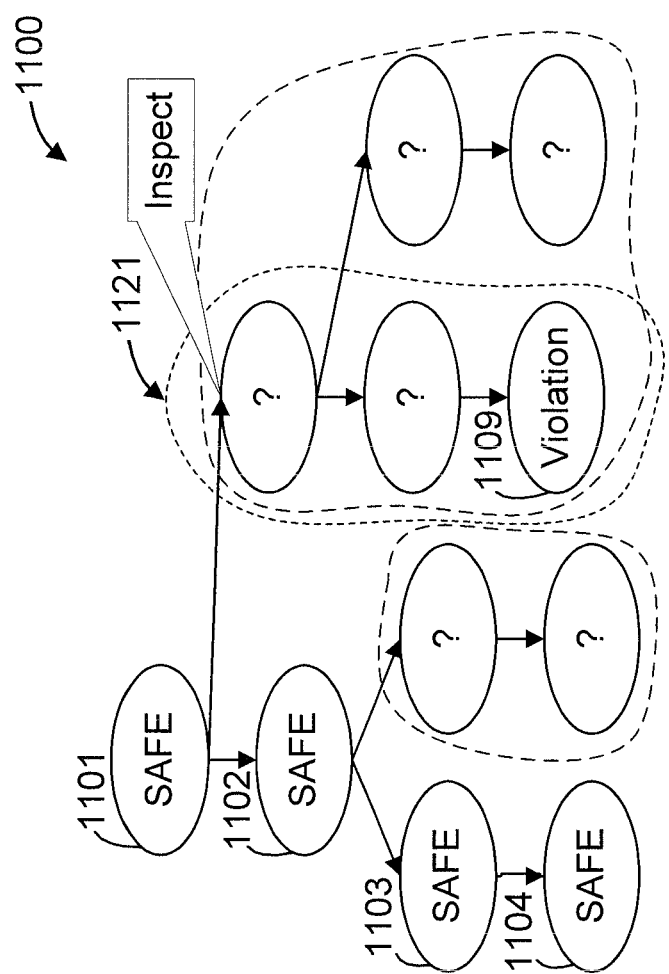
FIG. 14 shows an example of step 1040 of method 1000, in accordance with an embodiment of the present principles.

At step 1040, if a violation is found on the leaf image 1109, then apply bisection method search 1121 to the path from root image 1107 of subtree to the violation image 1109. FIG. 14 shows an example of step 1040, in accordance with an embodiment of the present principles.

Figure 15:
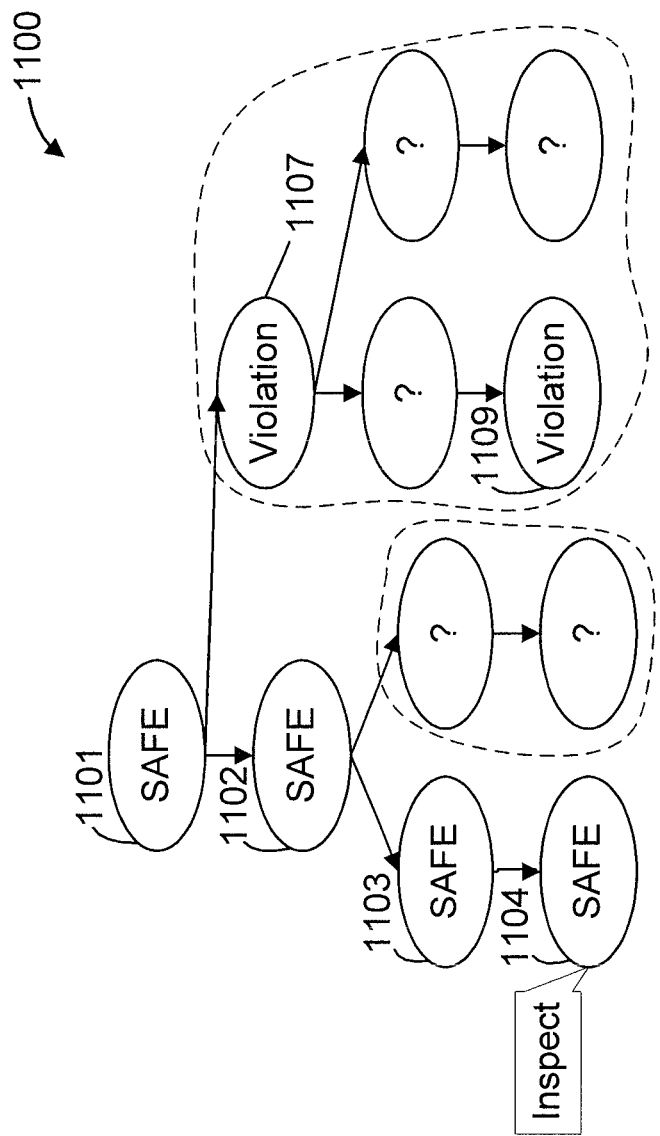
FIG. 15 shows an example of step 1050 of method 1000, in accordance with an embodiment of the present principles.

At step 1050, if a violation image's 1107 parent 110 is a safe image, then stop the bisection method. FIG. 15 shows an example of step 1020, in accordance with an embodiment of the present principles.

Figure 16:
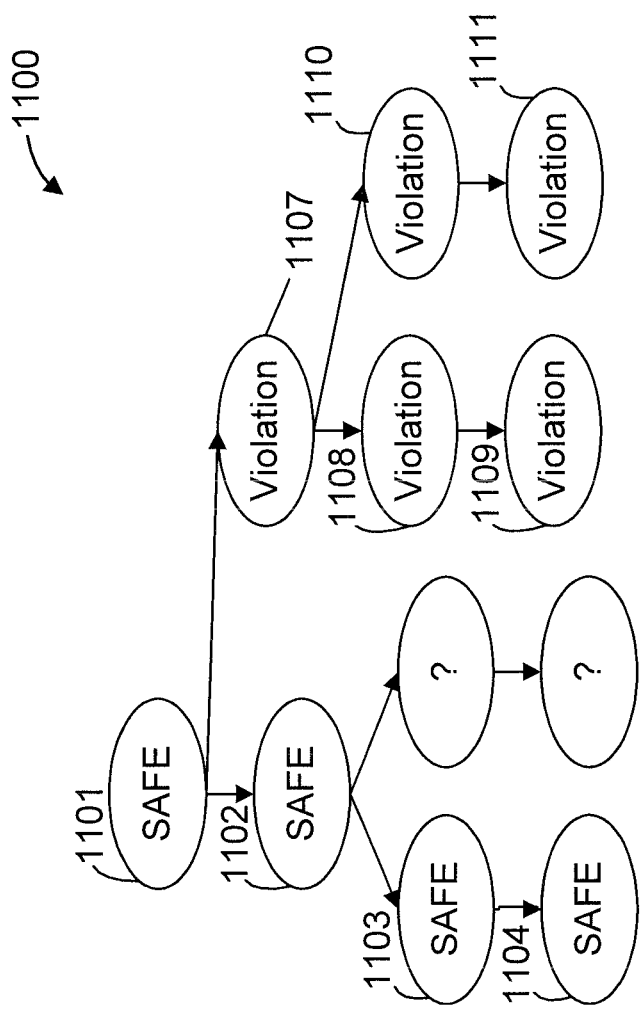
FIG. 16 shows an example of step 1060 of method 1000, in accordance with an embodiment of the present principles.

At step 1060, based on the assumptions, all images 1107, 1108 1109, 1110, and 1111 in the subtree of the violation image 1107 are also violation images. FIG. 16 shows an example of step 1020, in accordance with an embodiment of the present principles.

Figure 17:
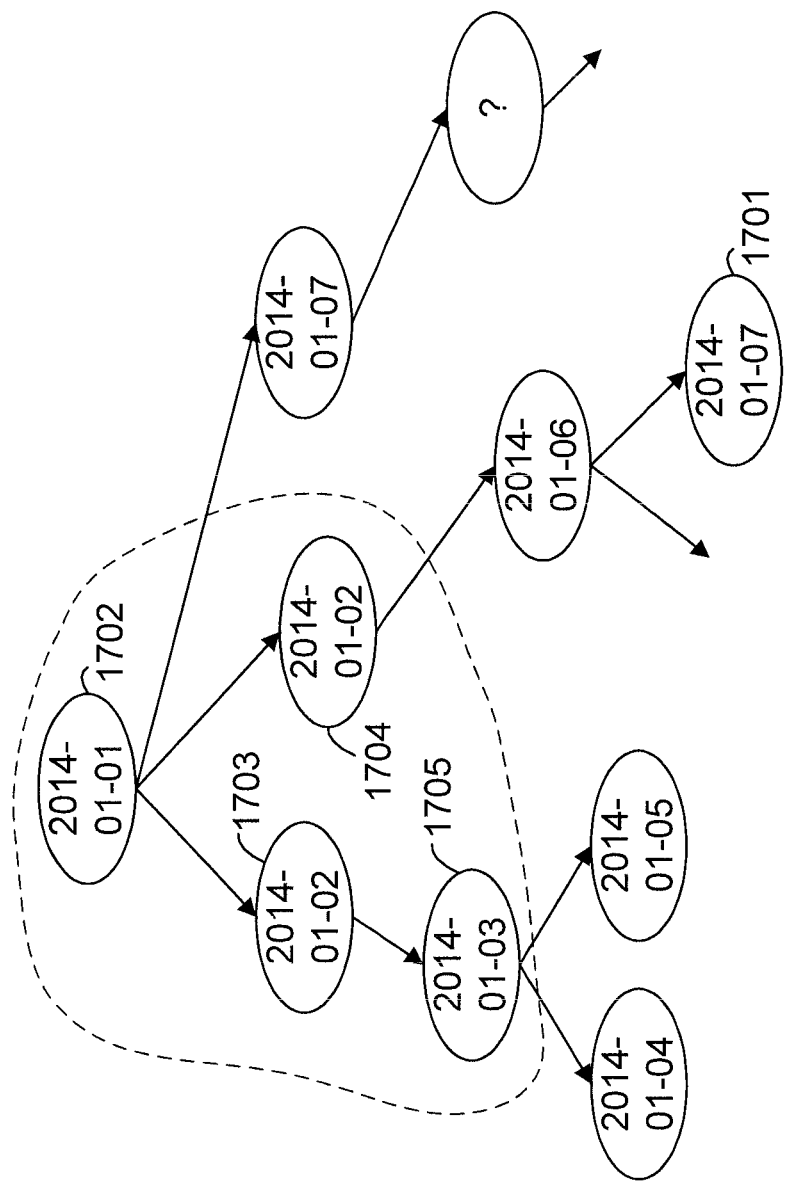
FIG. 17 is a diagram showing a violation image 1701 with a vulnerability timestamp and four images 1702, 1703, 1704, and 1705 that are safe based on their timestamps with respect to the vulnerability timestamp, in accordance with an embodiment of the present principles.

A description will now be given of an optimization, in accordance with an embodiment of the present principles. The optimization is described with respect to FIG. 17. FIG. 17 is a diagram showing a violation image 1701 with a vulnerability timestamp and four images 1702, 1703, 1704, and 1705 that are safe based on their timestamps with respect to the vulnerability timestamp, in accordance with an embodiment of the present principles. All sage images (i.e., 1701, 1702, 1703, 1704, and 1705) are shown using a dotted hatch pattern for ease of identification.

Thus, according to the optimization, safe images are identified with a timestamp of vulnerability. In an embodiment, for example, a software vendor may provide a timestamp from which it can be determined that a corresponding package of images includes a vulnerability in one of the images. If an image is created before the timestamp, then the image can be considered to be safe from the vulnerability without having to execute a security inspection.

Figure 18:
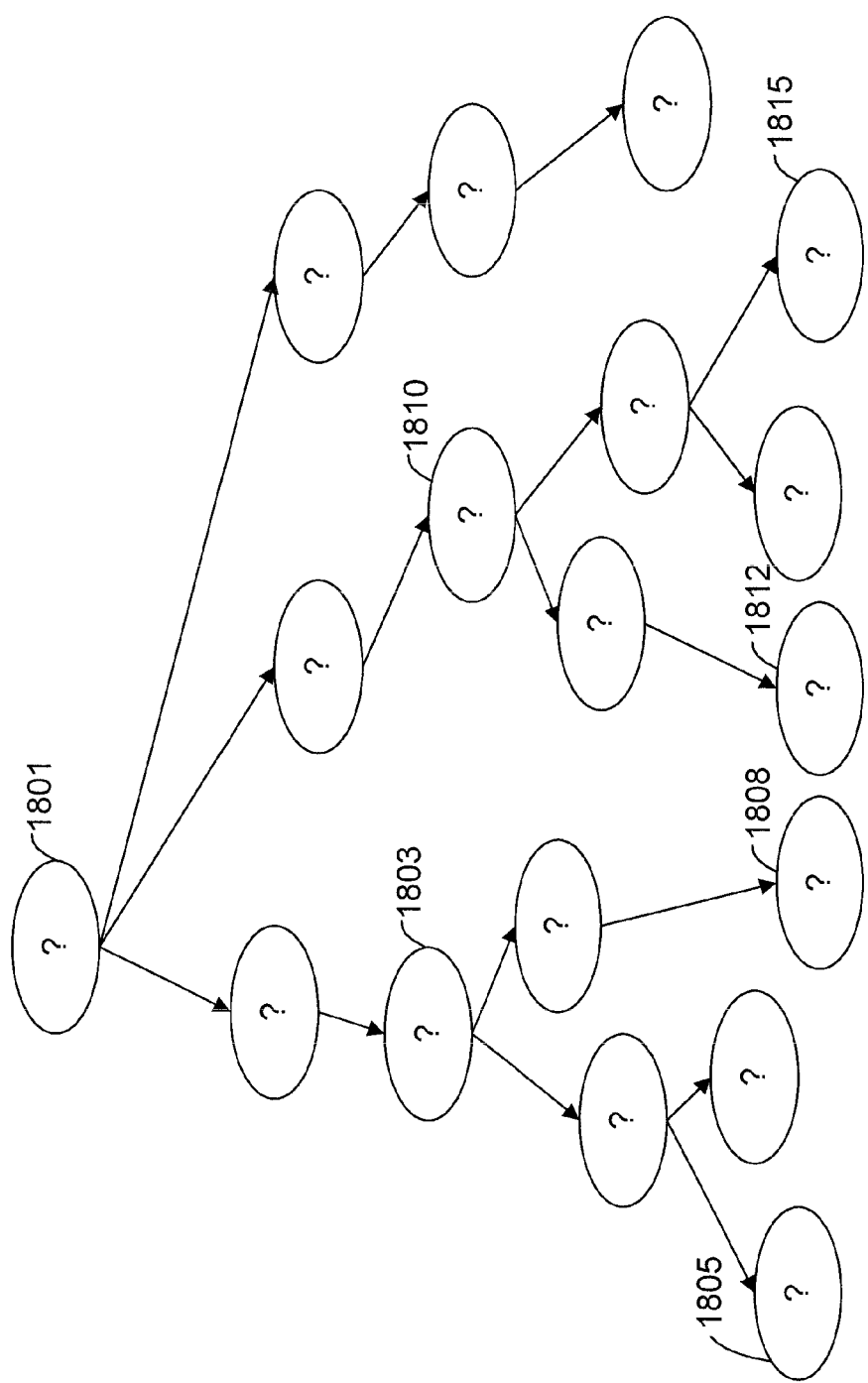
FIG. 18 is a diagram showing violation images 1801 and three nearest parent images 1802, 1803, and 1804 to the violation images 1801, in accordance with an embodiment of the present principles.

A description will now be given of another optimization, in accordance with an embodiment of the present principles. The optimization is described with respect to FIG. 18. FIG. 18 is a diagram showing violation images 1805, 1808, 1812, and 1815 and three nearest parent images 1801, 1803, and 1810 to the violation images 1801, in accordance with an embodiment of the present principles.

In an embodiment, if some violation leaf images are given, inspecting the common nearest parent images of violation images before applying the somewhat more random node selection method of FIG. 3 can accelerate a result obtained in accordance with the present principles. This is because the common nearest images to the violation images are promising candidates of the root cause image.

FIG. 19 shows exemplary pseudocode 1900 for virtual image inspection, in accordance with an embodiment of the present principles.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 20:
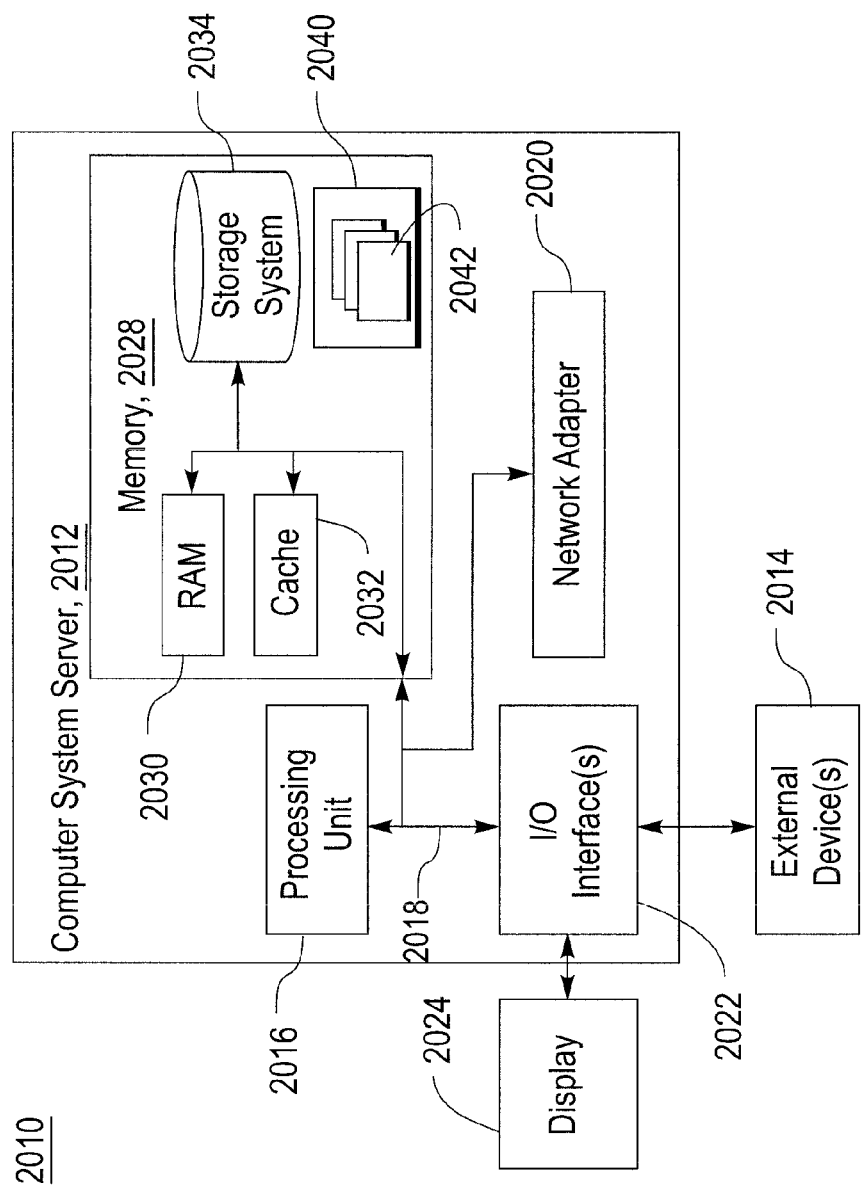
FIG. 20 shows an exemplary cloud computing node 2010, in accordance with an embodiment of the present principles.

Referring now to FIG. 20, a schematic of an example of a cloud computing node 2010 is shown. Cloud computing node 2010 is only one example of a suitable cloud computing node and is not intended to suggest any limitation as to the scope of use or functionality of embodiments of the invention described herein. Regardless, cloud computing node 2010 is capable of being implemented and/or performing any of the functionality set forth hereinabove.

In cloud computing node 2010 there is a computer system/server 2012, which is operational with numerous other general purpose or special purpose computing system environments or configurations. Examples of well-known computing systems, environments, and/or configurations that may be suitable for use with computer system/server 2012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 2012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 2012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 20, computer system/server 2012 in cloud computing node 2010 is shown in the form of a general-purpose computing device. The components of computer system/server 2012 may include, but are not limited to, one or more processors or processing units 2016, a system memory 2028, and a bus 2018 that couples various system components including system memory 2028 to processor 2016.

Bus 2018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 2012 typically includes a variety of computer system readable media. Such media may be any available media that is accessible by computer system/server 2012, and it includes both volatile and non-volatile media, removable and non-removable media.

System memory 2028 can include computer system readable media in the form of volatile memory, such as random access memory (RAM) 2030 and/or cache memory 1032. Computer system/server 2012 may further include other removable/non-removable, volatile/non-volatile computer system storage media. By way of example only, storage system 2034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 2018 by one or more data media interfaces. As will be further depicted and described below, memory 2028 may include at least one program product having a set (e.g., at least one) of program modules that are configured to carry out the functions of embodiments of the invention.

Program/utility 2040, having a set (at least one) of program modules 2042, may be stored in memory 2028 by way of example, and not limitation, as well as an operating system, one or more application programs, other program modules, and program data. Each of the operating system, one or more application programs, other program modules, and program data or some combination thereof, may include an implementation of a networking environment. Program modules 2042 generally carry out the functions and/or methodologies of embodiments of the invention as described herein.

Computer system/server 2012 may also communicate with one or more external devices 2014 such as a keyboard, a pointing device, a display 2024, etc.; one or more devices that enable a user to interact with computer system/server 2012; and/or any devices (e.g., network card, modem, etc.) that enable computer system/server 2012 to communicate with one or more other computing devices. Such communication can occur via Input/Output (I/O) interfaces 2022. Still yet, computer system/server 2012 can communicate with one or more networks such as a local area network (LAN), a general wide area network (WAN), and/or a public network (e.g., the Internet) via network adapter 2020. As depicted, network adapter 2020 communicates with the other components of computer system/server 2012 via bus 2018. It should be understood that although not shown, other hardware and/or software components could be used in conjunction with computer system/server 2012. Examples, include, but are not limited to: microcode, device drivers, redundant processing units, external disk drive arrays, RAID systems, tape drives, and data archival storage systems, etc.

Figure 21:
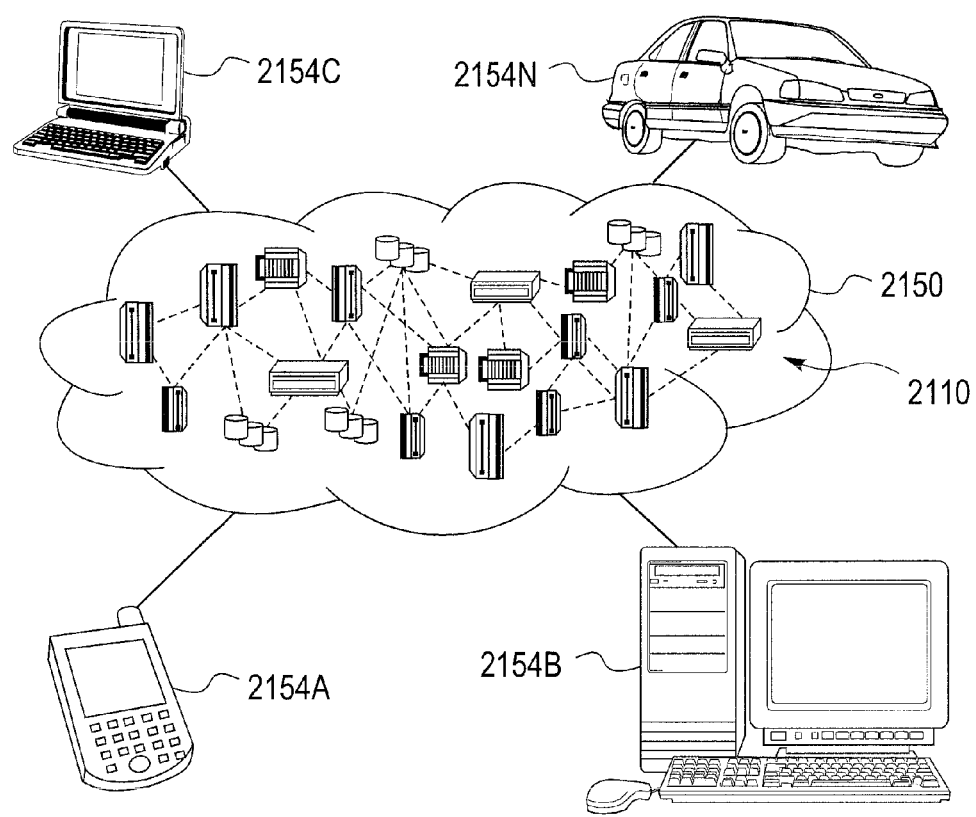
FIG. 21 shows an exemplary cloud computing environment 2050, in accordance with an embodiment of the present principles.

Referring now to FIG. 21, illustrative cloud computing environment 2150 is depicted. As shown, cloud computing environment 2150 comprises one or more cloud computing nodes 1110 with which local computing devices used by cloud consumers, such as, for example, personal digital assistant (PDA) or cellular telephone 2154A, desktop computer 2154B, laptop computer 2154C, and/or automobile computer system 2154N may communicate. Nodes 2110 may communicate with one another. They may be grouped (not shown) physically or virtually, in one or more networks, such as Private, Community, Public, or Hybrid clouds as described hereinabove, or a combination thereof. This allows cloud computing environment 2150 to offer infrastructure, platforms and/or software as services for which a cloud consumer does not need to maintain resources on a local computing device. It is understood that the types of computing devices 2154A-N shown in FIG. 21 are intended to be illustrative only and that computing nodes 2110 and cloud computing environment 2150 can communicate with any type of computerized device over any type of network and/or network addressable connection (e.g., using a web browser).

Figure 22:
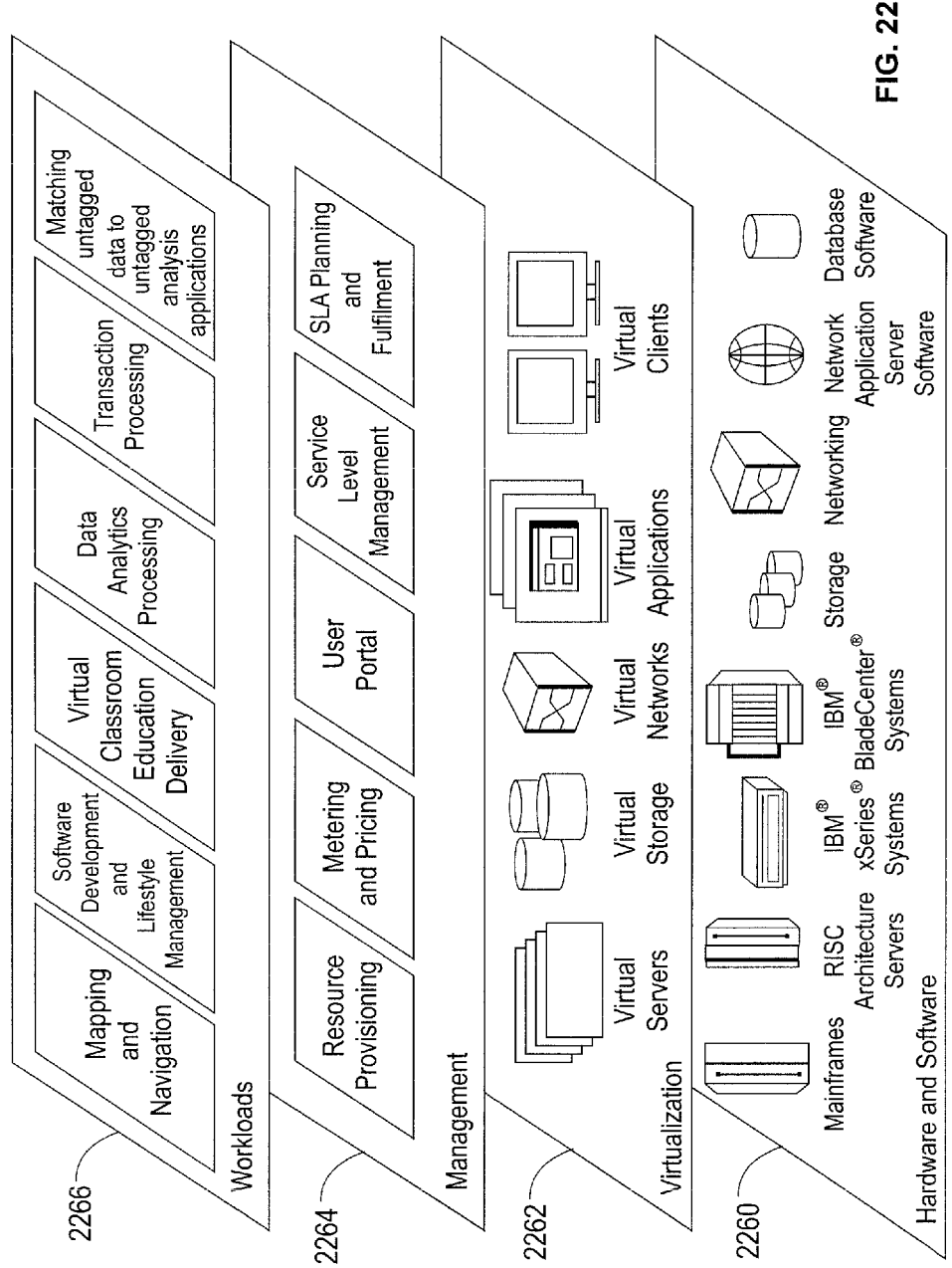
FIG. 22 shows exemplary abstraction model layers, in accordance with an embodiment of the present principles.

Referring now to FIG. 22, a set of functional abstraction layers provided by cloud computing environment 2150 (FIG. 21) is shown. It should be understood in advance that the components, layers, and functions shown in FIG. 22 are intended to be illustrative only and embodiments of the invention are not limited thereto. As depicted, the following layers and corresponding functions are provided:

Hardware and software layer 2260 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 2262 provides an abstraction layer from which the following examples of virtual entities may be provided: virtual servers; virtual storage; virtual networks, including virtual private networks; virtual applications and operating systems; and virtual clients.

In one example, management layer 2264 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 2266 provides examples of functionality for which the cloud computing environment may be utilized. Examples of workloads and functions which may be provided from this layer include: mapping and navigation; software development and lifecycle management; virtual classroom education delivery; data analytics processing; transaction processing; and security inspect of virtual hosts.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for performing a security inspection of a set of virtual images in a cloud infrastructure, the method comprising:
    merging the virtual images into a tree structure having a root and a plurality of leaves such that child leaves and a parent leaf to the child leaves have common ones of the virtual images;
    identifying a security violation in a given one of the virtual images at a given one of the plurality of leaves;
    applying a bisection method against a path in the tree from the root to the given one of the plurality of leaves to find a particular one of the virtual images that is a root cause of the security violation; and
    performing a corrective action for any of the plurality of images having the security violation.

2. The method of claim 1, further comprising identifying the virtual images in child leaves of the given one of the plurality of leaves as having the security violation in common with the given one of the virtual images at the given one of the plurality of leaves.

3. The method of claim 1, further comprising identifying the virtual image in a parent leaf of a certain one of the plurality of leaves as being free of the security violation when the certain one of the plurality of leaves is free of the security violation.

4. The method of claim 1, wherein said identifying step identifies the security violation using a set of rules based on parent-child relationships.

5. The method of claim 1, wherein the rules comprise:
    identifying the virtual images in child leaves of the given one of the plurality of leaves as having the security violation in common with the given one of the virtual images at the given one of the plurality of leaves; and
    identifying the virtual image in a parent leaf of a certain one of the plurality of leaves as being free of the security violation when the certain one of the plurality of leaves is free of the security violation.

6. The method of claim 1, wherein said identifying step is comprised in a leaf inspection step that commences at a deepest one of the plurality of leaves.

7. The method of claim 6, wherein the bisection method forms a plurality of subtrees, and the inspection commences at the deepest one of the plurality of leaves in a deepest one of the plurality of subtrees.

8. The method of claim 7, wherein a traversal order of the inspection step is from the deepest one of the plurality of leaves towards the root.

9. The method of claim 1, wherein at least one of the virtual images is associated with a timestamp associated with a security vulnerability such that any of the virtual images having an earlier timestamp are identified as being without the security vulnerability.

10. The method of claim 1, wherein said identifying step is comprised in a leaf inspection step that, upon identifying the security violation at the given one of the virtual images at the given one of the plurality of leaves, next inspects a common nearest parent leaf to the given one of the plurality of leaves.

11. The method of claim 1, wherein the corrective action comprises marking as defective any of the plurality of virtual images having the security violation.

12. The method of claim 1, wherein the corrective action comprises retrieving replacement virtual images for any of the plurality of virtual images having the security violation.

13. A computer program product for performing a security inspection of a set of virtual images in a cloud infrastructure, the computer program product comprising a non-transitory computer readable storage medium having program instructions embodied therewith, the program instructions executable by a computer to cause the computer to perform a method comprising:
    merging the virtual images into a tree structure having a root and a plurality of leaves such that child leaves and a parent leaf to the child leaves have common ones of the virtual images;
    identifying a security violation in a given one of the virtual images at a given one of the plurality of leaves;
    applying a bisection method against a path in the tree from the root to the given one of the plurality of leaves to find a particular one of the virtual images that is a root cause of the security violation; and performing a corrective action for any of the plurality of images having the security violation.

14. The computer program product of claim 13, further comprising identifying the virtual images in child leaves of the given one of the plurality of leaves as having the security violation in common with the given one of the virtual images at the given one of the plurality of leaves.

15. The computer program product of claim 13, further comprising identifying the virtual image in a parent leaf of a certain one of the plurality of leaves as being free of the security violation when the certain one of the plurality of leaves is free of the security violation.

16. The computer program product of claim 13, wherein said identifying step identifies the security violation using a set of rules based on parent-child relationships.

17. The computer program product of claim 13, wherein the rules comprise:
   identifying the virtual images in child leaves of the given one of the plurality of leaves as having the security violation in common with the given one of the virtual images at the given one of the plurality of leaves; and
   identifying the virtual image in a parent leaf of a certain one of the plurality of leaves as being free of the security violation when the certain one of the plurality of leaves is free of the security violation.

18. The computer program product of claim 13, wherein at least one of the virtual images is associated with a timestamp associated with a security vulnerability such that any of the virtual images having an earlier timestamp are identified as being without the security vulnerability.

19. The computer program product of claim 13, wherein said identifying step is comprised in a leaf inspection step that, upon identifying the security violation at the given one of the virtual images at the given one of the plurality of leaves, next inspects a common nearest parent leaf to the given one of the plurality of leaves.

20. A system for performing a security inspection of a set of virtual images in a cloud infrastructure, the system comprising:
   a hardware processor and a memory device, configured to:
      merge the virtual images into a tree structure having a root and a plurality of leaves such that child leaves and a parent leaf to the child leaves have common ones of the virtual images;
      identify a security violation in a given one of the virtual images at a given one of the plurality of leaves;
      apply a bisection method against a path in the tree from the root to the given one of the plurality of leaves to find a particular one of the virtual images that is a root cause of the security violation; and
      perform a corrective action for any of the plurality of images having the security violation.

* * * * *

UNITED STATES PATENT AND TRADEMARK OFFICE
CERTIFICATE OF CORRECTION

PATENT NO. : 10,003,613 B2  
APPLICATION NO. : 14/975057  
DATED : June 19, 2018  
INVENTOR(S) : Masayoshi Mizutani et al.

Page 1 of 1

It is certified that error appears in the above-identified patent and that said Letters Patent is hereby corrected as shown below:

On the Title Page

Item (72) Inventors: DELETE "Raymond H. P. Rudy" and INSERT --Rudy Raymond Harry Putra--

Signed and Sealed this  
Eighteenth Day of August, 2020

Andrei Iancu  
*Director of the United States Patent and Trademark Office*